(12) United States Patent
Wang et al.

(10) Patent No.: US 10,588,079 B2
(45) Date of Patent: Mar. 10, 2020

(54) APPARATUS AND METHOD FOR MANAGING HOT CELL DEVICES

(75) Inventors: Hong Wang, Beijing (CN); Huarui Liang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 801 days.

(21) Appl. No.: 13/373,658

(22) Filed: Nov. 23, 2011

(65) Prior Publication Data

US 2012/0135753 A1 May 31, 2012

(30) Foreign Application Priority Data

Nov. 26, 2010 (CN) .......................... 2010 1 0575852

(51) Int. Cl.
| | | |
|---|---|---|
| H04W 52/02 | (2009.01) | |
| H04W 84/04 | (2009.01) | |
| H04W 92/20 | (2009.01) | |
| H04W 48/06 | (2009.01) | |
| H04W 64/00 | (2009.01) | |

(52) U.S. Cl.
CPC ........ H04W 52/0206 (2013.01); *H04W 48/06* (2013.01); *H04W 64/003* (2013.01); *H04W 84/045* (2013.01); *H04W 92/20* (2013.01); *Y02D 70/00* (2018.01); *Y02D 70/1242* (2018.01); *Y02D 70/1262* (2018.01); *Y02D 70/164* (2018.01)

(58) Field of Classification Search
CPC ............... H04W 48/06; H04W 64/003; H04W 52/0206; H04W 28/0273
USPC ............................... 455/456.1, 436; 370/329
See application file for complete search history.

(56) References Cited

U.S. PATENT DOCUMENTS

| | | | | |
|---|---|---|---|---|
| 5,991,629 | A * | 11/1999 | Agrawal et al. | 455/446 |
| 6,584,330 | B1 * | 6/2003 | Ruuska | 455/574 |
| 2002/0077113 | A1 * | 6/2002 | Spaling | H04W 24/08 |
| | | | | 455/453 |
| 2002/0080799 | A1 * | 6/2002 | Voce et al. | 370/395.43 |
| 2006/0135173 | A1 * | 6/2006 | Vannithamby | 455/453 |
| 2007/0155395 | A1 * | 7/2007 | Gopalakrishnan et al. | 455/453 |

(Continued)

FOREIGN PATENT DOCUMENTS

| | | | | |
|---|---|---|---|---|
| CN | 101945462 A | | 1/2011 | |
| EP | 2056628 A1 * | | 5/2009 | H04W 52/02 |

(Continued)

OTHER PUBLICATIONS

International Search Report dated May 29, 2012 in connection with International Patent Application No. PCT/KR2011/009064.

(Continued)

*Primary Examiner* — Qun Shen

(57) ABSTRACT

A method for managing hot cell devices includes receiving at least one of location information of at least one hot cell device, type information of at least one hot cell, location information of at least one terminal and uplink signal energy of at least one terminal measured by a hot cell device. The method also includes determining a hot cell device to be opened using the at least one of the location information of at least one hot cell device, the type information of at least one hot cell, the location information of at least one terminal and the uplink signal energy of at least one terminal. In addition, the method includes transmitting a message instructing the hot cell device to open.

26 Claims, 7 Drawing Sheets

(56) References Cited

U.S. PATENT DOCUMENTS

| | | | |
|---|---|---|---|
| 2009/0290561 A1 | 11/2009 | Kleindl | |
| 2010/0041428 A1* | 2/2010 | Chen et al. | 455/522 |
| 2011/0044284 A1* | 2/2011 | Voltolina et al. | 370/331 |
| 2011/0201339 A1* | 8/2011 | Kuningas | 455/436 |
| 2011/0249556 A1* | 10/2011 | Matsutani et al. | 370/235 |
| 2011/0300887 A1 | 12/2011 | Österling | |
| 2012/0004009 A1* | 1/2012 | Lindoff | H04W 52/0232 455/522 |
| 2012/0207078 A1* | 8/2012 | Hwang et al. | 370/315 |

FOREIGN PATENT DOCUMENTS

| | | |
|---|---|---|
| KR | 2005 0000202 | 1/2005 |
| KR | 2005 0121136 | 12/2005 |
| KR | 2006 0062297 | 6/2006 |
| WO | WO 2009/058068 | 5/2009 |
| WO | WO 2010/093298 A1 | 8/2010 |
| WO | WO 2010/104433 A1 | 9/2010 |

OTHER PUBLICATIONS

Written Opinion of International Searching Authority dated May 29, 2012 in connection with International Patent Application No. PCT/KR2011/009064.

3GPP TSG RAN WG3 Meeting #59; "Dynammic Setup of HNBs"; Mitsubishi Electric; R3-080064; Feb. 11-15, 2008; Sorrento, Italy; 4 pages.

3GPP TSG RAN WG3 Meeting #61; "Dynamic Setup of HNBs for Energy Savings and Interference Reduction"; Mitsubishi Electric; R3-081949; Aug. 18-22, 2008; Jeju Island, Korea; 7 pages.

Extended European Search Report dated Jun. 22, 2015, in connection with Application No. 11843066.9; 9 pages.

Translated text of The Notification of The First Office Action; State Intellectual Property Office of P.R. China, dated Aug. 5, 2015 in connection with Chinese Patent Application No. 201010575852.5; 15 pages.

Notification of Second Office Action issued for CN 201010575852.5 dated Mar. 11, 2016, 11 pgs.

Foreign Communication From a Related Counterpart Application, Chinese Application No. 201010575852.5, Decision of Rejection dated Jan. 17, 2017, 14 pages.

Communication from a foreign patent office in a counterpart foreign application, "Notice of Preliminary Rejection," Korean Application No. 10-2011-0118974, dated Aug. 14, 2017, 11 pages.

Qualcomm Incorporated, "Assisting Inter-RAT Nodes/sNBs in Turning on Sleeping Cells," R3-103417, 3GPP TSG RAN WG3 Meeting #70, Jacksonville, USA, Nov. 15-19, 2010, 2 pages.

Catt, "ES Parameters Coordination-based Energy Saving Solution," R3-103235, 3GPP TSG RAN WG3 #70, Jacksonville, USA, Nov. 15-19, 2010, 3 pages.

Catt; "UE-assisted Selective Activation of the Hotspots"; 3GPP TSG RAN WG3#70; R3-103234; Jacksonville, US; Nov. 15-19, 2010; 3 pages.

Foreign Communication from Related Counterpart Application; Korean Patent Application No. 10-2011-0118974; Korean Office Action dated Feb. 19, 2018; 11 pages.

Foreign Communication from Related Counterpart Application; Korean Patent Application No. 10-2011-0118974; Notice of Patent Grant dated Apr. 4, 2018; 3 pages.

Notification of Third Office Action issued for CN 201010575852.5 dated Sep. 12, 2016, 10 pages.

\* cited by examiner

APPARATUS AND METHOD FOR MANAGING HOT CELL DEVICES

CROSS-REFERENCE TO RELATED APPLICATION(S) AND CLAIM OF PRIORITY

The present application is related to and claims the benefit under 35 U.S.C. § 119 (a) of a Chinese patent application filed in the Chinese Intellectual Property Office on Nov. 26, 2010 and assigned Serial No. 201010575852.5, the entire disclosure of which is hereby incorporated by reference.

TECHNICAL FIELD OF THE INVENTION

The present invention relates to communication technologies, and more particularly, to method for managing hot cell devices.

BACKGROUND OF THE INVENTION

At present, sustainable development is a long-term target of human beings, enhancing energy efficiency and reducing energy consumption is becoming an increasingly important topic. In the communication field, how to enhance energy efficiency of devices and terminals is a key part for saving energy.

FIG. 1 illustrates an area repeated covered by several cells in prior art. The same area as shown in FIG. 1 is repeated covered by multiple cells, in which, cell B 120, cell C 130, cell D 140 and cell E 150 of Long Term Evolution (LTE) are completely covered by cell A 110. Cell A may be a Universal Mobile Telecommunications System (UMTS) cell, or a Global System of Mobile communication (GSM) cell or an LTE cell. Cell A provides basic radio coverage for the area and is an earliest deployed cell. With the increasing of user capacity, users are concentrated and user capacity is very high in some areas, and the user-concentrated area is just a user hot area, on where new cell devices need to be deployed to provide service for users in the hot area. For example, cell B 120, cell C 130, cell D 140 and cell E 150 are all hot cells, and the main objective of these hot cells is to improve user capacity, and provide more advanced access technology. Cell A seamlessly covers the area and provides service for the area, thereby is called completely covered cell. The coverage of hot cells is discontinuous.

User capacities of some hot areas change with time or by the turn of events. If a cell base station in these hot areas also works normally when there is no user capacity, much electric energy will be uselessly consumed, this is obviously conflicted with the sustainable development target. Therefore, a cell device of a hot area may be closed and provide no access service while there is no user capacity, and be opened and provide access service for users at air interface while there is user capacity, thus to achieve the purpose of energy saving and consumption reduction.

There are several methods for closing a cell device at the present time. In one method, when a cell device will be closed is determined by a central operation and maintenance device. Some information is configured in the operation and maintenance device in advance, and when a close condition is satisfied, the operation and maintenance device determines that the cell device will be closed. For example, operators pre-set some closing strategies in an operation and maintenance device, when the closing strategies are satisfied, the operation and maintenance device transmits a signaling to request a cell device to stop transmitting and receiving air signals, thus putting the cell device into a close state. In another method, a cell of a hot area reports its user capacity to the operation and maintenance device, when the user capacity is lower than a threshold for a period of time, the operation and maintenance device transmits a command to make a cell device of the hot area be closed. After the cell device is closed, the cell transmits a message to neighboring cells for notifying them that the cell is in a closed state. In yet another method, a cell device determines when to close itself. Operators pre-set some closing strategies in a cell device of a hot area, and when the closing strategies are satisfied, the cell device is automatically closed and transmits a message to neighboring cells for notifying them that the cell is in a close state.

After the cell device in a hot area is closed, the cell providing basic radio coverage provides service for users in the area. When the number of users in the hot area increases, and when user capacity of the cell providing basic radio coverage exceeds the threshold, the cell device in the hot area needs to be opened. Open methods include the following.

In a first method, open strategies are pre-set in an operation and maintenance device, and when an open condition is satisfied, the operation and maintenance device transmits a command to make the cell device in the hot area be opened.

In a second method, open strategies are pre-set in a cell device of a hot cell (called as hot cell device hereinafter for simplification), and when an open condition is satisfied, the hot cell device is automatically opened and provides service for users.

In a third method, when a cell providing basic radio coverage detects that user capacity of the cell exceeds a certain threshold, the cell providing basic radio coverage transmits a command to a hot cell device, and requires the hot cell device to open and provide service. Then some users in the cell providing basic radio coverage are switched to the new opened cell.

In a fourth method, an Interference over Thermal (IoT) is monitored after the cell device of a hot area is closed. The IoT is a ratio of received interference energy to thermal noise. After the hot cell is closed, terminals are served by the cell providing basic radio coverage, and signals of the terminals are interference signals to the closed cell. The larger the user capacity and the closer the proximity to the hot cell device, the more serious the interference and the higher the IoT. It can be seen that the higher IoT means the user capacity near the hot cell is larger. When the user capacity of the cell providing basic radio coverage increases, a device in the cell providing basic radio coverage (called as basic coverage cell device hereinafter for simplification) requests the cell device of a hot area to report the IoT, and then according to the IoT determines which hot cell devices to be opened.

It can be seen from above-mentioned methods for managing hot cell devices, there are at least following problems in the prior art.

At first, in the same region, there is more than one hot area and more than one corresponding hot cell device. When the user capacity of the cell providing basic radio coverage exceeds a threshold, the cell providing basic radio coverage transmits a message to all hot cell devices and commands all hot cell devices to open. However, users in the cell providing basic radio coverage can be switched to one or part of the hot cells, and there may be no user capacity in other hot cells, thereby when all hot cell devices are open will lead to energy wasting.

Secondly, some hot cells have larger coverage, and others have smaller coverage. If an IoT monitored by a hot cell is higher, but coverage of the hot cell is smaller, then users can be covered by another hot cell, and then an inappropriate cell device can be opened by utilizing technical solutions in the prior art.

Thirdly, when a cell device of a hot area receives an open command, the cell device opens capabilities of whole cell, for instance, opens all antenna ports. However in the ordinary course of events, the number of users to be switched to a hot cell is not larger at the beginning, and the capabilities of whole cell are all opened in the prior art conflicts with the target of energy saving. If the hot cell devices are configured to gradually open device capabilities, when a larger numbers of users in the cell providing basic radio coverage need to be switched to hot cells, requirement of the cell providing basic radio coverage (called as basic coverage cell hereinafter for simplification) can not be satisfied.

It is obvious that, the conventional methods for managing hot cell devices can cause energy wasting.

SUMMARY OF THE INVENTION

To address the above-discussed deficiencies of the prior art, it is a primary aspect of the present invention to address at least the above mentioned problems and/or disadvantages and to provide at least the advantages described below. Accordingly, an aspect of the present invention is to provide an apparatus and a method for managing hot cell devices, which can save energy.

According to one aspect of the present invention, a method for managing hot cell devices includes receiving at least one of location information of at least one hot cell device, type information of at least one hot cell, location information of at least one terminal and uplink signal energy of at least one terminal measured by a hot cell device, determining a hot cell device to be opened using the at least one of the location information of at least one hot cell device, the type information of at least one hot cell, the location information of at least one terminal and the uplink signal energy of at least one terminal, and transmitting a message instructing the hot cell device to open.

According to another aspect of the present invention, a method for an operation of a hot cell device includes transmitting at least one of location information of the hot cell device, type information of a hot cell the hot cell device belongs and uplink signal energy of at least one terminal measured by the hot cell device, receiving a message instructing the hot cell device to open, and opening capabilities of the hot cell device.

According to yet another aspect of the present invention, an apparatus for managing hot cell devices includes a communication unit that can receive at least one of location information of at least one hot cell device, type information of at least one hot cell, location information of at least one terminal and uplink signal energy of at least one terminal measured by a hot cell device, and a controller that can determine a hot cell device to be opened using the at least one of the location information of at least one hot cell device, the type information of at least one hot cell, the location information of at least one terminal and the uplink signal energy of at least one terminal and controlling to transmit a message instructing the hot cell device to open.

According to still another aspect of the present invention, an apparatus for a hot cell device includes a communication unit that can transmit at least one of location information of the hot cell device, type information of a hot cell the hot cell device belongs and uplink signal energy of at least one terminal measured by the hot cell device, and, can receive a message instructing the hot cell device to open, and a controller that can open capabilities of the hot cell device.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION OF THE INVENTION

FIGS. 2 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communications system.

Embodiments of the present invention provide a method for managing hot cell devices. For convenience of explanation, terms and names defined in a Long Term Evolution (LTE) standard are used in the present invention. However, the present invention is not limited to these terms and names, and thus can also apply to a system conforming to another standard.

Figure 2:
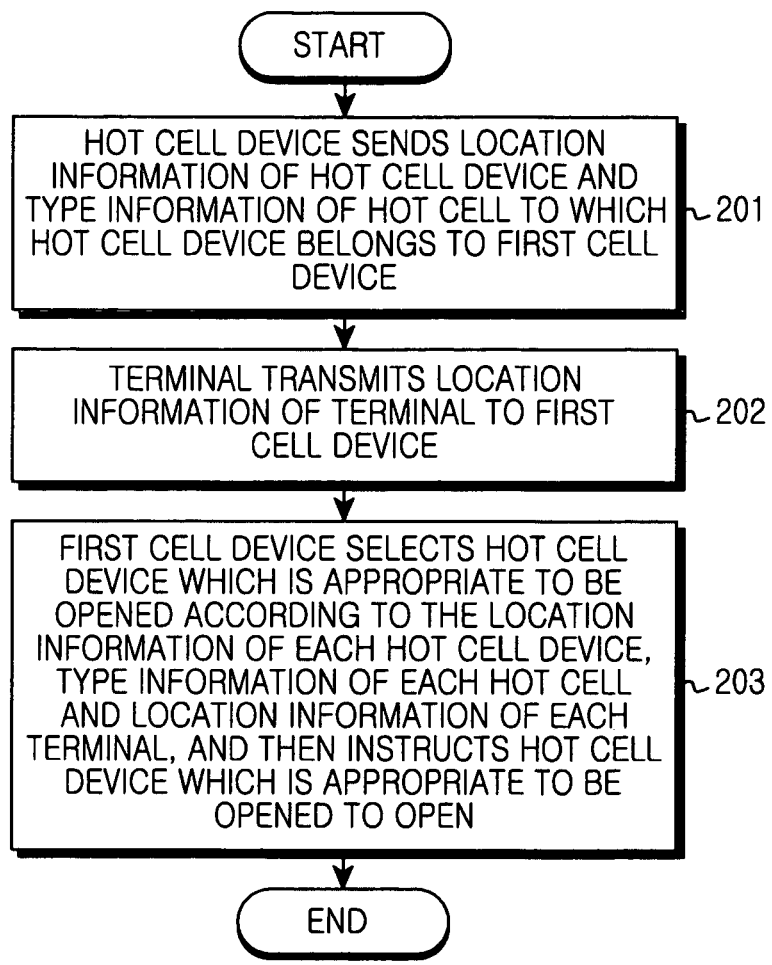
FIG. 2 illustrates a method for managing hot cell devices in accordance with embodiments of the present invention.

FIG. 2 illustrates a method for managing hot cell devices of the present invention, and the method includes the following processes.

Referring to FIG. 2, in step 201, a hot cell device transmits location information of the hot cell device and type information of a hot cell to a first cell device. Herein the cell device may be referred as 'a base station', 'evolved NodeB (eNB)', and so forth. A terminal transmits location information of the terminal to the first cell device in step 202. Herein, the terminal may be referred as 'a User Equipment (UE)'. The first cell device selects a hot cell device, which is appropriate to be opened according to the location information of each hot cell device, type information of each hot cell and portion information of terminals, and then instructs the hot cell device that is appropriate to be opened to open in step 203. Of course, the step 202 can also be performed before the step 201.

The above-mentioned step 201 can be achieved with various ways, for example, the information can be transmitted after the hot cell device is closed, or be transmitted in the process of establishing X2 interface, or be transmitted through a S1 interface message, and so forth. In above-mentioned step 202, the first cell device can directly require the terminal to report location information of the terminal, or can require the hot cell device to measure signal energy of terminal covered by the hot cell device, and report measured signal energy to the first cell device, the first cell device obtains information of the terminals covered by the hot cell device according to the signal energy reported by the hot cell device. In above-mentioned step 203, the first cell device can further indicate a load to be undertaken by the hot cell device, and the hot cell device can determine to open all or part of capabilities according to the indication and load capacity of itself.

Embodiments of the present invention also provide a method for managing hot cell devices, the method includes:

A hot cell device transmits location information of the hot cell device and type information of a hot cell to a first cell device. The first cell device configures the hot cell device to be closed and to measure uplink signal energy of terminals, the hot cell device feeds back uplink signal energy of the terminals to the first cell device. The first cell device selects a hot cell device, which is appropriate to be opened according to the location information of each hot cell device, the type information of each hot cell and the uplink signal energy of the terminals, and instructs the hot cell device that is appropriate to be opened to open.

In above-mentioned two methods, the first cell device can determine to open one or part of hot cell devices according to obtained information, thus energy consumption of devices in network can be reduced.

Embodiments of the present invention provide a method for managing hot cell devices, the method includes:

A first cell device instructs a hot cell device to open and indicates a load to be undertaken by the hot cell device. The hot cell device opens all or part of capabilities according to its load capacity and the load indicated by the first cell device. In this way, the hot cell device can open all or part of capabilities according to actual requirement, thus energy of hot cell devices can be saved.

The present invention will be described hereinafter in detail with reference to some specific embodiments.

A first embodiment will be described.

Figure 1:
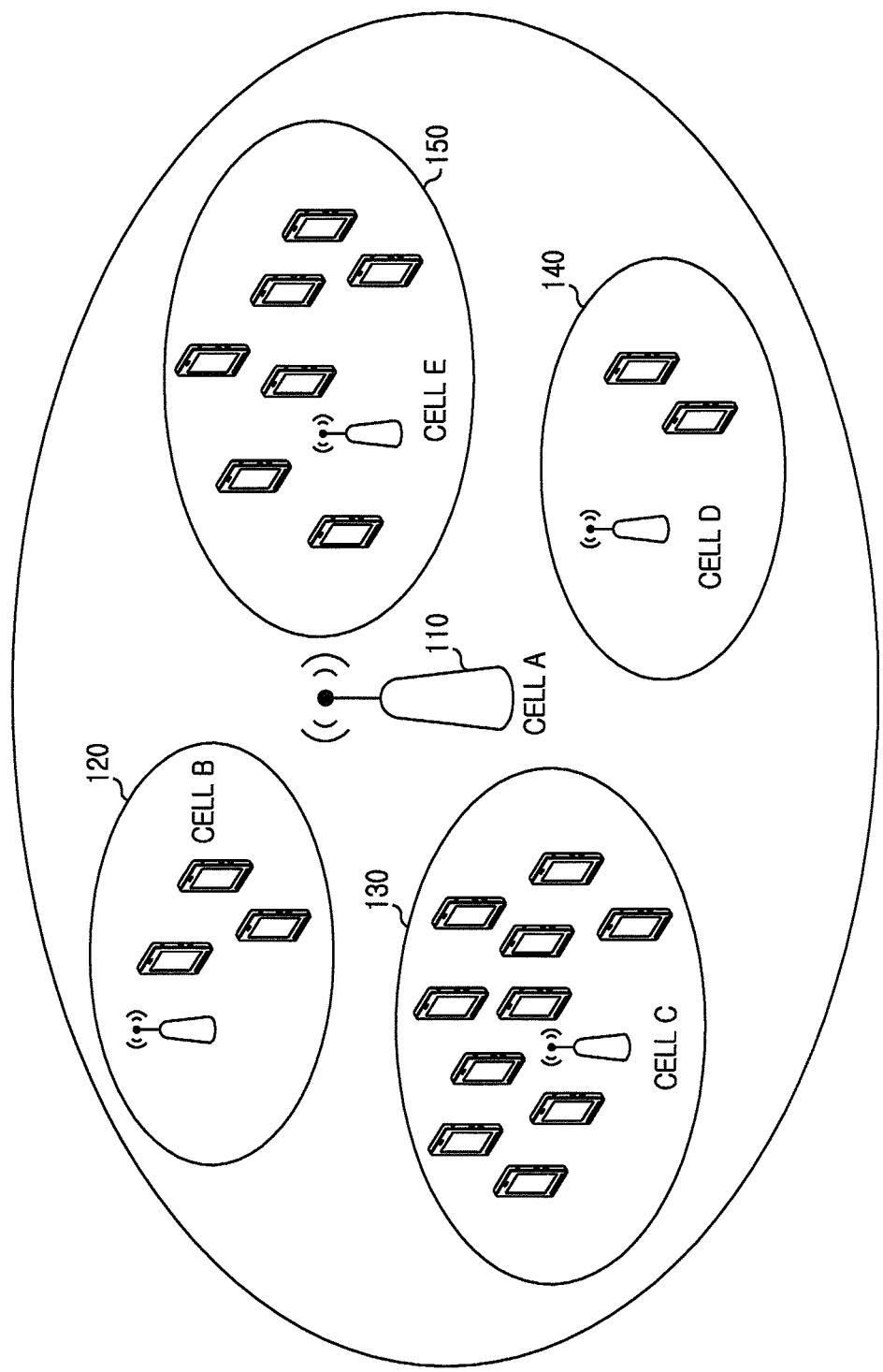
FIG. 1 illustrates an area repeated covered by several cells in prior art.

The embodiment applies to the system as shown in FIG. 1. In the system, cell A 110 is a basic coverage cell, and provides basic radio coverage for a certain area; cell B 120, cell C 130, cell D 140 and cell E 150 are hot cells in the signal coverage of cell A 110, and are cells deployed for further enhancing system capacity. Each hot cell can be closed when the user capacity is smaller, and be opened when the user capacity is larger. Cell A can adopt conventional radio interface technologies, such as Wideband Code Division Multiple Access (WCDMA) and GSM, or cell A 110 can also adopt LTE access system or other future access system. The hot cell can be LTE access system, or other access system.

When a hot cell device is closed, the hot cell device notifies a basic coverage cell device of location information of the hot cell device and type information of the hot cell. Alternatively, the hot cell device can notify the basic coverage cell device of the information in preceding steps, for example, can notify when an X2 interface is established, or notify in a handover message. Subsequently, when the user capacity of the basic coverage cell increases, the basic coverage cell device determines which hot cell will be opened according to location of hot cell devices and types of hot cells. In the embodiment, the hot cell notifies location information of hot cell device and type information of the hot cell when the hot cell is closed. The embodiment will be described hereinafter in detail with reference to the accompanying drawing.

Figure 3:
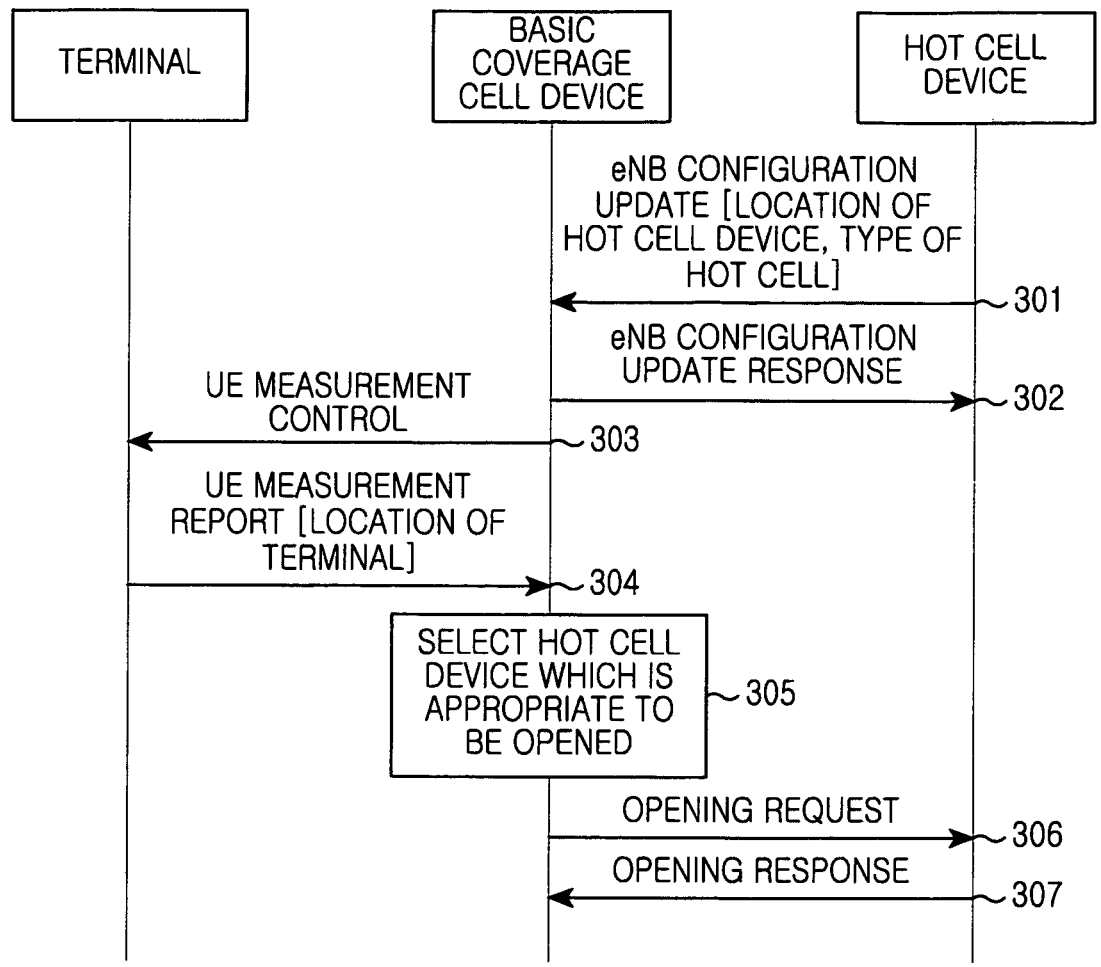
FIG. 3 illustrates a method for managing hot cell devices in accordance with a first embodiment of the present invention.

FIG. 3 illustrates a method for managing hot cell devices in accordance with the first embodiment of the present invention. The method includes the following processes.

Referring to FIG. 3, in step 301, the number of users in a hot cell reduces, the user capacity decreases, and most of capacities of hot cells are available. When the user capacity is lower than a predefined threshold, in order to save electricity, a hot cell device can close a transmitting and receiving function of air interface.

Before closing, if a user in connection mode remains, the user in connection mode in the hot cell is switched to the basic coverage cell, and the switching process is the same as that already defined. Then, the hot cell device transmits a cell closing message to the basic coverage cell device, to inform the basic coverage cell device of that the hot cell device itself is in close state and no users can be switched to the hot cell. The above-mentioned cell closing message can utilize an existing defined eNodeB (eNB) configuration update message, or a new defined cell closing message. The cell closing message includes a unique identifier of a hot cell to be closed. The cell closing message also includes geographical location information of the hot cell device. The geographical location information can be information of longitude or latitude. If a GPS apparatus is installed on the hot cell device, accurate information of longitude or latitude can be obtained. Alternatively, geographical location information of the hot cell device can be pre-stored in the hot cell device. Once the hot cell device is deployed, its location is relatively fixed, therefore, the geographical location information of the hot cell device can be configured in the hot cell device by an operation and maintenance device or artificial means. The cell closing message also includes a cell type of the hot cell, and the cell type indicates a coverage area size of the hot cell. Cells corresponding to different cell types have different coverage area sizes, in which, the coverage area of macro cell is largest, and the coverage area of femtocell is smallest. The cell type included in the cell closing message can indicate an actual diameter or radius of the coverage area of the cell, or indicate a size grade of the coverage area of the cell, for instance, the size grade of the coverage area can be minuteness, smallness, middling, largeness, and so forth. The cell types can also be set to different cell type names, such as macro cell, micro cell, pico cell and femtocell, where different cell type names correspond to different coverage areas.

The cell closing message in step 301 is an eNB configuration update message, after receiving the cell closing message, the basic coverage cell transmits an eNB configuration update response message to the hot cell device in step 302. If the cell closing message in step 301 is other message, the basic coverage cell transmits corresponding response message to the hot cell device. After receiving the corresponding response message, the hot cell device enters into a close state. The hot cell device in a closed state stops transmitting and receiving air interface signals, but the connection of the hot cell device to other eNB interface or Core Network (CN) interface does not break, and the hot cell device can receive messages transmitted from other cells or CN.

The basic coverage cell device transmits a measurement control message to a terminal for configuring the terminal regarding which measurement to perform and how to report measurement results in step 303. In the present embodiment, the basic coverage cell device configures the terminal to measure geographical location of the terminal and report measured geographical location to the basic coverage cell device. The step can be performed before steps 301 and 302.

The terminal transmits measurement report message to the basic coverage cell device in step 304. The measurement report message includes location information of the terminal, such as GPS location information. The basic coverage cell device obtains the location information of the terminal.

If user capacity of the basic coverage cell increases and exceeds a pre-configured capacity threshold, some users in the basic coverage cell should be switched to other cells. The basic coverage cell device, according to obtained location information of terminals, detects that location of some terminals is concentrated, the terminals are located on a hot area, a hot cell has been deployed on this area, and that the hot cell is just in the closed state. If the hot cell is opened and these terminals are switched to the hot cell, the user capacity of the basic coverage cell can be reduced. Thus, in step 305, the basic coverage cell device can select a hot cell device, which is appropriate to be opened in accordance with location information of terminals and location information of each hot cell device obtained in step 302.

If there are two hot cell base stations whose locations are very close, and one has a big coverage while the other has small coverage, when the basic coverage cell base station determines which hot cell device will be opened, it is required for the basic coverage cell base station to refer to not only average location of terminals and location of hot cell devices, but also the coverage of the hot cell. The size of the coverage of the hot cell can be obtained by determining based on the cell type in step 301. For example, to take cell B 120 and cell C 130, it is supposed that cell B 120 is a pico cell and cell C 130 is a femtocell, the coverage radius of cell B 120 is larger than that of cell C 130. Multiple terminals are located near the two cells, on average, the distance from terminals to cell C 130 is shorter than that from terminals to cell B 120. That is, terminals are nearer to cell C 130 if only distance factor is considered, cell C 130 should be opened, and the terminals are all switched to the cell C 130. However, the coverage of cell C 130 is very small, and if cell C 130 is opened, transmitting signals of cell C 130 cannot reach the terminals, and then, the terminals cannot detect information transmitted by cell C 130, so the terminals in the basic coverage cell cannot be switched to cell C 130. It can be seen that opening cell C 130 dose not play a part in sharing the user capacity of the basic coverage cell. At this time, cell types should be considered and cell B 120 should be opened; or to be on the safe side, cell B 120 and cell C 130 can be both opened.

Therefore, when the basic coverage cell device selects a hot cell device that is appropriate to be opened, it is required to refer to not only location information of terminals and location information of each hot cell device, but also coverage of each hot cell device, that is, type of hot cell device.

The basic coverage cell device transmits an opening request message to the selected hot cell device that is appropriate to be opened, to instruct the selected hot cell device to begin to work in step 306.

The hot cell device that received the opening request message is opened and feeds back an opening response message to the basic coverage cell device in step 307.

Then, the basic coverage cell device receives measurement reports of terminals, and according to the measurement reports, the terminals handover to a new opened hot cell. This switching process is the same as that already defined.

A second embodiment will be described.

The embodiment applies to the system as shown in FIG. 1. In the embodiment, the hot cell notifies the location information of each hot cell device and type information of the hot cell when X2 interface is established. The embodiment will be described hereinafter in detail with reference to the accompanying drawing.

Figure 4:
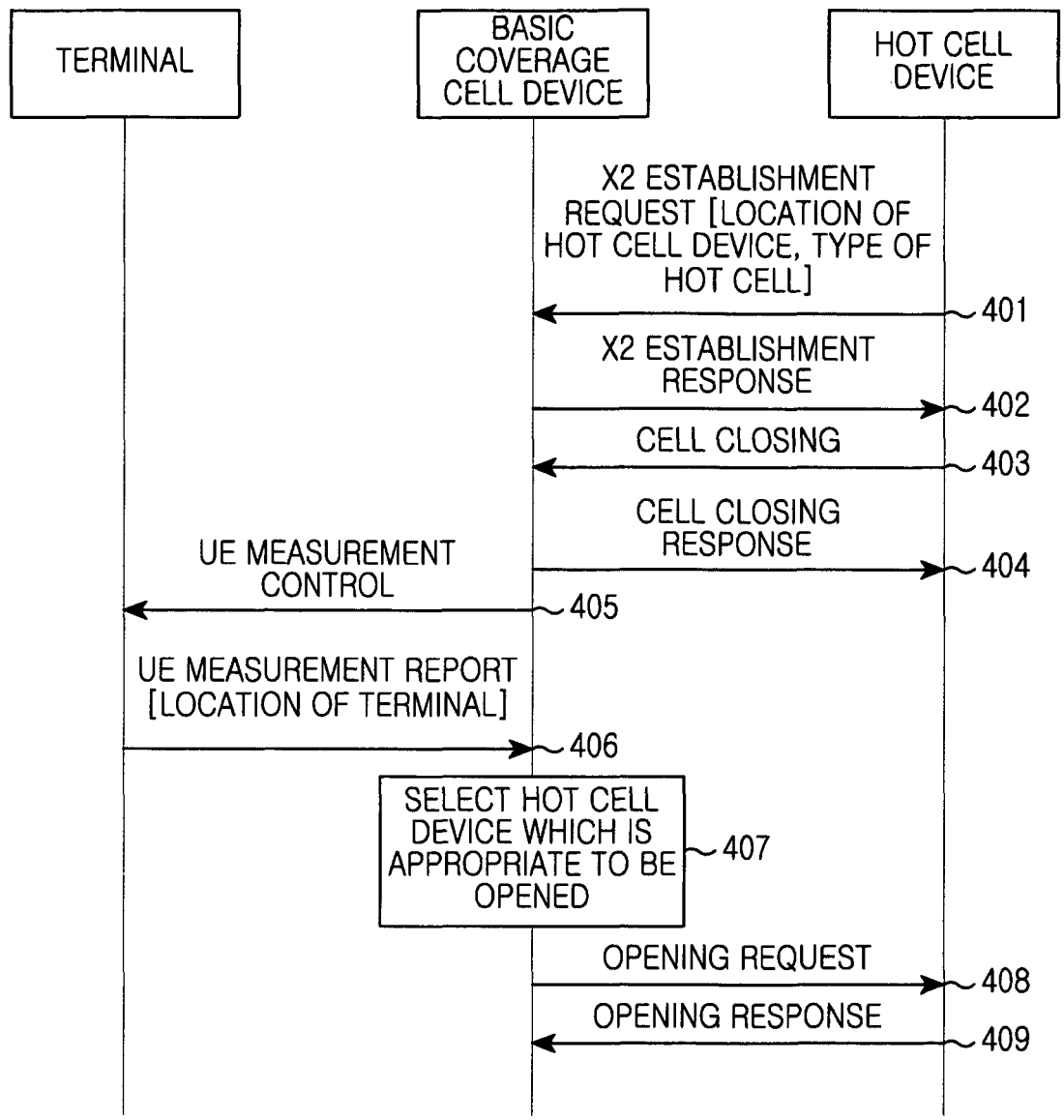
FIG. 4 illustrates a method for managing hot cell devices in accordance with a second embodiment of the present invention.

FIG. 4 illustrates a method for managing hot cell devices in accordance with the second embodiment of the present invention. The method includes the following processes.

In step 401, a hot cell device transmits an X2 establishment request message to the basic coverage cell device. The X2 establishment request message includes a unique identifier of the hot cell. The X2 establishment request message also includes geographical location of the hot cell device. The geographical location can be information of longitude or latitude. The X2 establishment request message also includes cell type of the hot cell, and the cell type indicates a coverage area size of the hot cell.

The basic coverage cell device transmits an X2 establishment response message to the hot cell device in step 402. Alternatively, step 401 can also be initiated by the basic coverage cell device, therefore, the X2 establishment response message transmitted by the hot cell device in step 402 includes the unique identifier of the hot cell, geographical location of the hot cell device and cell type of the hot cell.

When user capacity of a hot cell is lower than a threshold, the hot cell device is closed and transmits a cell closing message to the basic coverage cell device for notifying the basic coverage cell device that the hot cell device is in close state in step 403.

The basic coverage cell device transmits the hot cell device a cell close response message in step 404.

The basic coverage cell device transmits a measurement control message to a terminal, the measurement control message is used to configure the terminal regarding which measurement to perform and how to report measurement results in step 405. In the present embodiment, the basic coverage cell device configures the terminal to measure geographical location of the terminal and report measured geographical location to the basic coverage cell device.

The terminal transmits measurement report message to the basic coverage cell device in step 406. The measurement report message includes location information of the terminal, such as GPS location information. The basic coverage cell device obtains the location information of the terminal.

If user capacity of the basic coverage cell exceeds a threshold, the basic coverage cell device, according to obtained location of a large number of terminals, location of each hot cell device and type of each hot cell, determines which hot cell should be opened in step 407. The process of determining which hot cell should be opened is the same as that described in step 305 of the first embodiment, no further description will be provided here. For example, when the basic coverage cell device selects a hot cell device that is appropriate to be opened, the basic coverage cell device refers to not only location information of terminals and location information of each hot cell device, but also coverage of each hot cell device, that is, type of hot cell device.

The basic coverage cell device transmits an opening request message to selected hot cell device that is appropriate to be opened, to instruct the selected hot cell device to begin to work in step 408.

The hot cell device that received the opening request message is opened and feeds back an opening response message to the basic coverage cell device in step 409. Subsequently, the basic coverage cell device receives measurement reports of terminals, and according to the measurement reports, the terminals are switched to new opened hot cell.

Alternatively, the location of each hot cell device and type of each hot cell can be transmitted to the basic coverage cell device through a S1 interface. Specifically, when the basic coverage cell device detects a new hot cell around it, the basic coverage cell device transmits an eNB configuration transmission message to the hot cell device requesting to obtain a transport layer address of the hot cell device. In the response message, the hot cell device can notify the basic coverage cell device of location information of the hot cell device and type information of the hot cell. The present embodiment does not exclude using other S1 processes. It is taken for an example that cell C 130 is a hot cell, and the method includes the following processes.

Cell A 110 transmits an eNB configuration transmission message to a Mobility Management Entity (MME), and the message contains an identifier of a base station of cell C 130. The MME forwards the message to cell C 130. Cell C 130 transmits an eNB configuration transmission message to the MME, and the message contains a transport layer address of the base station of cell C 130, also includes location of the base station of cell C 130 and type of cell C 130. The MME forwards the message to cell A 110.

Alternatively, cell C 130 transmits an eNB configuration transmission message to the MME, and the message contains the identifier of the base station of cell C 130, also includes location of the base station of cell C 130 and type of cell C 130. The MME forwards the message to cell A 110. Cell A 110 transmits an eNB configuration transmission message to the MME, and the message contains a transport layer address of the base station of cell C 130. The MME forwards the message to cell C 130.

Cell A 110 obtains device location and cell type of cell C 130. Then, the step of determining which hot cell should be opened is the same as that in the first embodiment, therefore no further descriptions will be provided here.

A third embodiment will be described.

The embodiment applies to the system as shown in FIG. 1, and the embodiment will be described hereinafter in detail with reference to the accompanying drawing.

Figure 5:
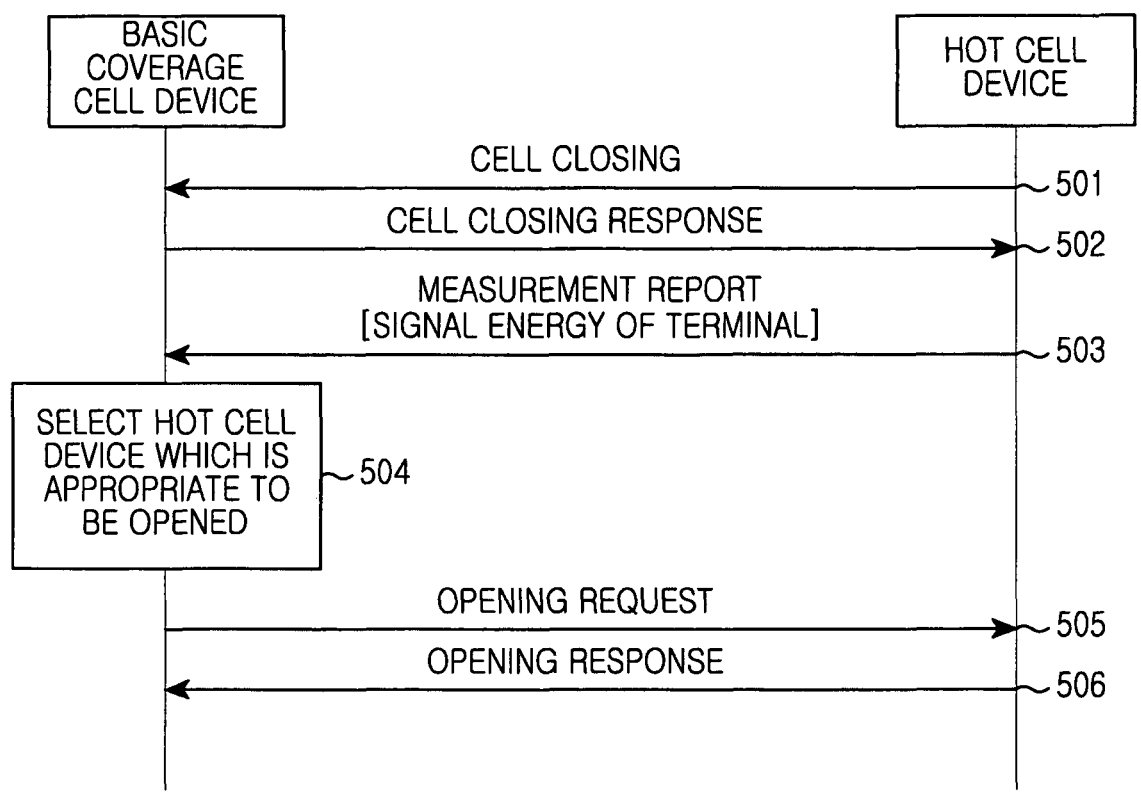
FIG. 5 illustrates a method for managing hot cell devices in accordance with a third embodiment of the present invention.

FIG. 5 illustrates a method for managing hot cell devices in accordance with the third embodiment of the present invention. The method includes the following processes.

Referring to FIG. 5, in step 501, capacity of a hot cell is in an idle state for a period of time, in order to save electricity, a device of the hot cell (also referred to as a hot cell device) closes transmitting function of air interface, and transmit a cell closing message to the basic coverage cell device, to notify the basic coverage cell device of close state of the hot cell. The cell closing message contains a unique identifier of the hot cell to be closed. The cell closing message also contains geographical location of the hot cell device. The geographical location can be information of longitude or latitude. The cell closing message also contains cell type of the hot cell, and the cell type indicates a coverage area size of the hot cell.

The basic coverage cell device transmits a cell closing response message to the hot cell device in step 502. The cell closing response message contains carrier frequency information of the basic coverage cell, and the carrier frequency information includes serial number of uplink radio frequency and uplink bandwidth. With the serial number, the corresponding uplink carrier frequency can be determined. Unit of the bandwidth is radio resource block. With the carrier frequency information, the hot cell device is configured to receive uplink signals at the uplink carrier frequency. The cell closing response message includes an instruction to instruct the hot cell device to measure, after the hot cell device is closed, signal energy of terminal, and report measurement results. At this time, the terminals receive service by attaching to the basic coverage cell, therefore, it is required for the hot cell device to monitor signals of the terminals at the uplink carrier frequency of the basic coverage cell. After the hot cell device is closed, the hot cell device receives uplink signals at the uplink carrier frequency of the basic coverage cell and measure an IoT. A high IoT means that the user capacity near the geographical location of the hot cell device is large.

The hot cell device reports measurement results about signal energy of terminals based on configuration in step 503. The hot cell device needs to report measurement results to the basic coverage cell device, the report mechanism can be event triggering, or periodic report, or report while the basic coverage cell device transmits a message for requesting measurement results. According to the different report mechanisms, the cell closing message also can include the following. The cell closing message also includes a threshold. The hot cell device measures signal energy of users, such as IoT. If the IoT exceeds the threshold, the hot cell device takes the initiative to report to the basic coverage cell device. The cell closing message also includes a period (T) for reporting measurement results, the hot cell device reports measurement results periodically according to the period T.

User capacity of the basic coverage cell increases and exceeds a pre-configured capacity threshold. Some users in the basic coverage cell should be switched to other cells. If the basic coverage cell has received IoT reports of hot cells, and finds one of a few IoTs reported by hot cells are larger, which suggests that user capacities of these hot cells are larger, and then the basic coverage cell first can attempt to make the one of a few hot cells opened.

In actual deployment, deployed geographical locations of two hot cells can be closer to each other. At this time, it cannot be based solely on the IoT results of hot cells to determine which hot cell should be opened, location of hot cell devices and types of hot cells should be also referred to. For example, cell B 120 and cell C 130 are deployed in a near location, cell B 120 is a pico cell, and cell C 130 is a femtocell, coverage radius of cell B 120 is larger than that of cell C 130. IoT measured by cell B 120 is smaller than that measured by cell C 130. If only measured IoTs are considered, the basic coverage cell determines that there is a large user capacity near cell C 130, and a device of cell C 130 should be opened, and then the terminals in the basic coverage cell A 110 are switched to cell C 130. However, the coverage of cell C 130 is very small, if the device of cell C 130 is opened, transmitting signals of cell C 130 cannot cover the terminals, and the terminals cannot detect information transmitted by cell C 130, measurement reports transmitted to cell A 110 by the terminals does not contain measurement results of signals of cell C 130, so the terminals in cell A 110 can't be switched to cell C 130. It can be seen that opening cell C 130 does not play a part in sharing the user capacity of cell A 110. At this time, locations of hot cell devices and cell types should be considered and cell B 120 should be opened; or to be on the safe side, cell B 120 and cell C 130 both can be opened.

If cell A 110 does not receive measurement reports of hot cells, cell A 110 can transmit a measurement result request message to all hot cells, to request the hot cells to carry measurement result in corresponding response message. When determining which hot cell will be opened, cell A 110 needs to refer to measurement results, location of hot cell devices and types of hot cells. The processing method is the same as that of above-mentioned.

The basic coverage cell transmits a cell opening request message to hot cell determined in step 505. A device of the hot cell receiving the cell opening request message is opened, the hot cell is switched to normally work state, and transmits and receives signals via air interface in step 506. The device of the hot cell also transmits an opening response message to the basic coverage cell device.

Subsequently, terminals of cell A 110 measure signals of neighbor cells, if a terminal is near a base station of the new opened hot cell, the terminal measures signals of the hot cell and transmits measurement reports to cell A 110. According to the measurement reports, terminals in cell A 110 are switched to the new opened cell, thus load of cell A 110 is decreased. The measurement process is the same as that defined at present, and no further descriptions will be provided.

In the embodiment, the basic coverage cell device obtains location of hot cell devices and types of hot cells through the cell closing message of step 501, in other embodiments, the basic coverage cell also can obtain the information in proceeding steps, for instance, when X2 interface is established, or through S1 interface.

A fourth embodiment will be described.

In above-mentioned three embodiments, after the hot cell device is closed, if a cell opening request message transmitted by the basic coverage cell device is received, the hot cell device is completely opened. In fact, at the initial stage when the hot cell device is open, not many terminals can be switched to the hot cell. Therefore, when receiving the cell opening request message, the hot cell device can be partially or completely opened in light of actual conditions. Thus, energy saving is achieved. This method will be described in the present embodiment.

Figure 6:
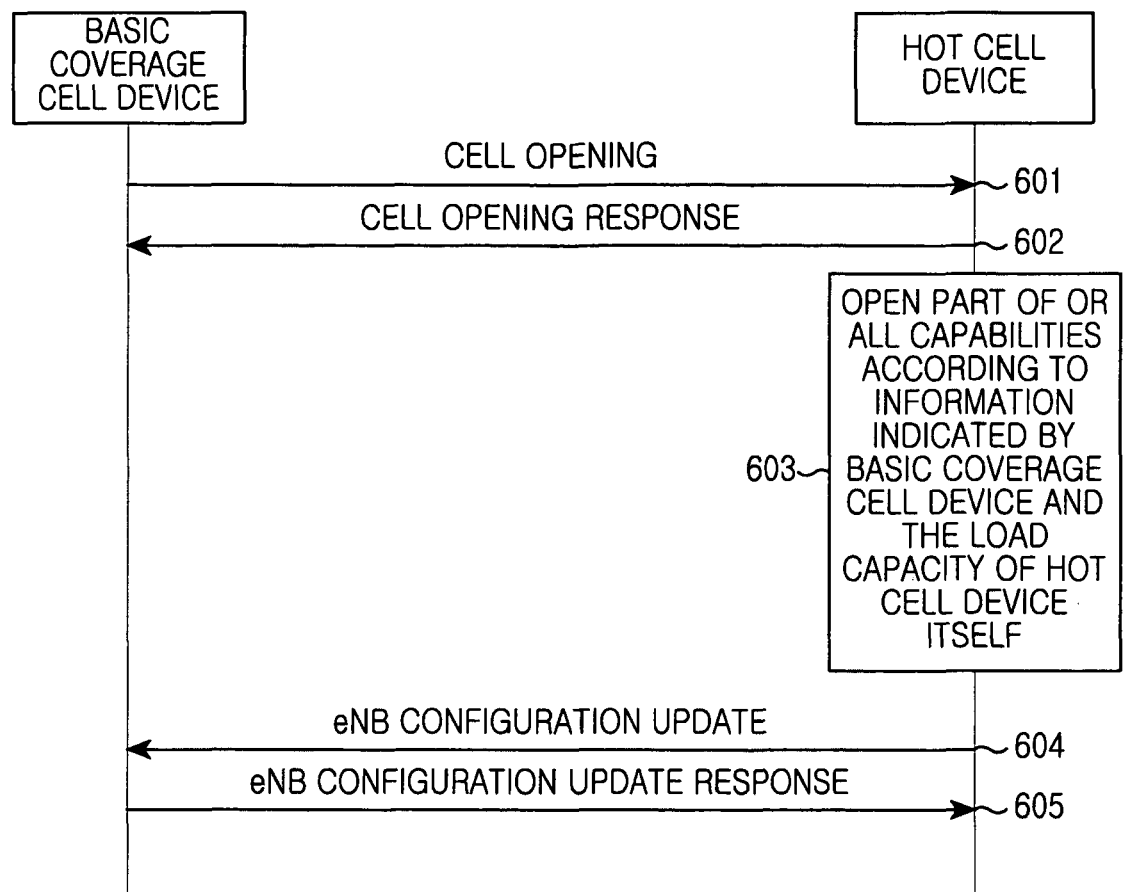
FIG. 6 illustrates a method for managing hot cell devices in accordance with a fourth embodiment of the present invention.

FIG. 6 illustrates a method for managing hot cell devices in accordance with a fourth embodiment of the present invention. In initial state, the hot cell device is in a close state. The method includes the following processes.

Referring to FIG. 6, in step 601, a user capacity of the basic coverage cell increases, and exceeds a pre-defined threshold. It is required for a device in the basic coverage cell (also called as basic coverage cell device) to instruct other cells covered by the basic coverage cell device to open. The basic coverage cell can determine which hot cell device should be opened in accordance with the methods of the present invention, and then transmit a cell opening message to the hot cell device determined, to instruct the hot cell device to open. Alternatively, the basic coverage cell can transmit a message to all hot cell devices to instruct them to open transmitting and receiving functions of air interface.

The cell opening message contains a user capacity should be undertaken by a hot cell to receive the message. The user capacity indicates a load that the basic coverage cell wants other hot cell to bear. For example, the user capacity can indicate an absolute load, or a capacity grade of the basic coverage cell and a capacity value to be undertaken by other hot cell. Capacity grades of cells are graduated according to total transmission resource. Grade 1 denotes the smallest cell capacity, and grade 100 denotes the largest cell capacity. The actual capacity of a cell is proportional to the capacity grade of the cell. The actual capacity of a cell can be calculated according to the capacity grade of the cell. The capacity value to be undertaken by other hot cell indicates a ratio of a load to be shared out to the actual capacity of the basic coverage cell. According to a capacity grade of the basic coverage cell and the capacity value to be undertaken by other hot cell, a load to be undertaken by the hot cell can be calculated.

The hot cell device transmits a cell opening response message to the basic coverage cell device in step 602. According to user capacity information indicated by the basic coverage cell and load capacity of the hot cell device itself, the hot cell device can be partially or completely opened in step 603. If the user capacity that the basic coverage cell requires others to share can be satisfied when the hot cell device opens part of capabilities, the hot cell device can first open part of capabilities, so energy of the hot cell device can be saved. Opening part of capabilities means that the cell can utilize low bandwidth, or reduce transmitting antenna ports, or even configure more Multicast-Broadcast Single Frequency Network (MBSFN) sub frames whose amount is larger than a threshold. When user capacity increases, the hot cell can further gradually open all capabilities to provide more resources.

For example, the capacity grade of the basic coverage cell is 10, and the capacity value to be shared out is 10%, the capacity grade of a hot cell is 2. The total capacity corresponding to the capacity grade 10 is five times that corresponding to the capacity grade 2. If the hot cell can provide the user capacity that the basic coverage cell requires the hot cell to be undertaken by only configuring half of bandwidth, the hot cell can only configure half of bandwidth.

If necessary, the hot cell device transmits an eNB configuration update message to the basic coverage cell device in step 604. Herein, the eNB configuration update message includes new configuration information, such as new antenna port, or new MBSFN sub frame configuration information. If there is no difference between information included the eNB configuration update message and configuration information transmitted to the basic coverage cell device last time, steps 604 and 605 can not be performed.

The basic coverage cell device transmits an eNB configuration response message to the hot cell device in step 605.

Four embodiments for managing hot cell devices of the present disclosure are described above. In above-mentioned embodiments, it is taken for an example for describing that the basic coverage cell device serves as the main subject for managing hot cell devices. Other cell device can be utilized to serve as the main subject for managing hot cell devices in other embodiments of the present invention, and the functions of the cell device are the same as that of the basic coverage cell device of the above-mentioned embodiments. No further descriptions will be provided here.

In conclusion, methods for managing hot cell devices provided by the present disclosure can only open a hot cell base station which can share the user capacity of the basic coverage cell, and avoid opening all hot cell base stations covered by the basic coverage cell, thus can save energy. Alternatively, when a hot cell base station is opened, the user capacity of to be shared by the hot cell base station can be estimated, thus can make the hot cell base station open part of capabilities and decrease energy consumption.

Figure 7:
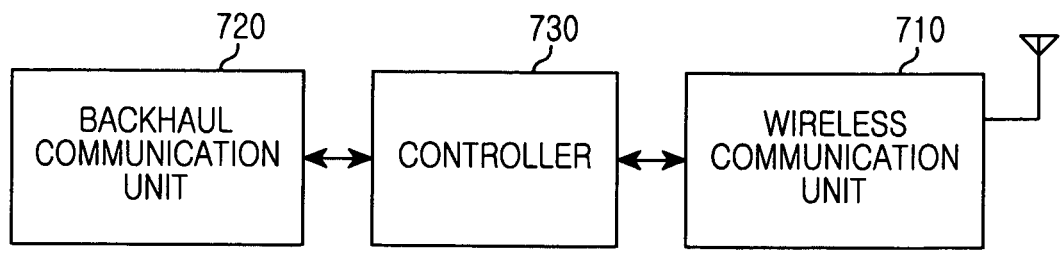
FIG. 7 illustrates a cell device in accordance with an embodiment of the present invention.

FIG. 7 illustrates a cell device in accordance with an embodiment of the present invention.

Referring to FIG. 7, the cell device includes a wireless communication unit 710, a backhaul communication unit 720 and a controller 730.

The wireless communication unit 710 provides an interface for transmitting and receiving signals in a radio channel. For example, the wireless communication unit 710 performs functions, such as signal band conversion and amplification, to transmit and receive signals over the radio channel. That is, the wireless communication unit 710 up-converts a baseband signal into the RF signal and transmits the RF signal over an antenna, and down-converts the RF signal received over the antenna into the baseband signal. Although not illustrated, for example, the wireless communication unit 710 can include an amplifier, a mixer, an oscillator, a Digital to Analog Converter (DAC), an Analog to Digital Converter (ADC) and the like. Further, the wireless communication unit 710 converts the baseband signal and a bit string according to a physical layer standard of the system. For example, to transmit data, the wireless communication unit 710 generates complex symbols by encoding and modulating a transmit bit string, maps the complex symbols to subcarriers, and constitutes Orthogonal Frequency Division Multiplexing (OFDM) symbols by applying Inverse Fast Fourier Transform (IFFT) and inserting a Cyclic Prefix (CP). When receiving data, the wireless communication unit 710 splits the baseband signal into OFDM symbols, restores the signals mapped to the subcarriers using Fast Fourier Transform (FFT), and restores the receive bit string by demodulating and decoding the signals.

The backhaul communication unit 720 provides an interface to communicate with other entities (i.e., other cell devices, MME and so on). More specifically, the backhaul communication unit 720 converts the bit string transmitted by the cell device into a physical signal, and converts the physical signal received at the cell device into the bit string. For example, the backhaul communication unit 720 supports an X2 interface and a S1 interface.

The controller 730 controls the overall functions of the cell device. For example, the cell device is a basic coverage cell device, the controller 730 controls to manage hot cell devices according to the embodiments of the present invention. For example, the cell device is a hot cell device, the controller 730 controls to close and to open according to the embodiments of the present invention.

The foregoing description is only preferred embodiments of the present invention and is not used for limiting the protection scope thereof. Any modification, equivalent substitution, or improvement made without departing from the spirit and principle of the present invention should be covered by the protection scope of the present invention.

What is claimed is:

1. A method for managing a plurality of base stations, the method comprises:
   receiving type information of the plurality of base stations and information on uplink signal energy of at least one terminal determined by the plurality of base stations;
   identifying a base station among the plurality of base stations based on the type information of the plurality of base stations and the information on uplink signal energy of the at least one terminal, wherein the base station is in a closed state providing no access service to terminals; and
   transmitting a message for transitioning the base station from the closed state to an open state to provide the access service to the terminals,
   wherein respective type information of respective base station among the plurality of base stations is related to a size of coverage of the respective base station.

2. The method of claim 1, wherein the message comprises information indicating an amount of load to be processed to be covered by the base station.

3. The method of claim 1, wherein the type information of the base station is received from the base station when the base station is transitioning from the open state to the closed state.

4. The method of claim 1, wherein the type information of the plurality of base stations is received through a second message for X2 interface establishment.

5. The method of claim 1, wherein the type information of the plurality of base stations is received via mobility management entity (MME).

6. A method for an operation of a base station, the method comprises:
   transmitting type information of the base station, and information on uplink signal energy of at least one terminal determined by the base station;
   receiving a message for transitioning the base station from a closed state to an open state to provide an access service to terminals, wherein the message is received in the closed state where the base station provides no access service to terminals; and
   providing the access service to the terminals by transitioning the base station from the closed state to the open state,
   wherein the base station is identified from among a plurality of base stations based on the type information of the base station and the information on the uplink signal energy,
   wherein the type information of the base station is related to a size of coverage of the base station.

7. The method of claim 6, wherein the message comprises information indicating an amount of load to be processed by the base station.

8. The method of claim 7, further comprising:
   determining whether to activate the base station partly or completely based on a capability of the base station and the amount of the load to be processed indicated by the message.

9. The method of claim 6, wherein the type information of the base station is transmitted when the base station is transitioning from the open state to the closed state.

10. The method of claim 6, wherein the type information of the base station is transmitted through a second message for X2 interface establishment.

11. The method of claim 6, wherein the type information of the base station is transmitted via mobility management entity (MME).

12. An apparatus for managing a plurality of base stations, the apparatus comprises:
- a communication unit configured to receive type information of the plurality of base stations and information on uplink signal energy of at least one terminal determined by the plurality of base stations; and
- a controller configured to identify a base station among the plurality of base stations based on the type information of the plurality of base stations and the information on uplink signal energy of the at least one terminal, and to control to transmit a message for transitioning the base station from a closed state to an open state to provide an access service to terminals,
- wherein the base station is in the closed state where the base station provides no access service to the terminals,
- wherein respective type information of respective base station among the plurality of base stations is related to a size of coverage of the respective base station.

13. The apparatus of claim 12, wherein the message comprises information indicating an amount of load to be processed by the base station.

14. The apparatus of claim 12, wherein the type information of the base station is received from the base station when the base station is transitioning from the open state to the closed state.

15. The apparatus of claim 12, wherein the type information of the plurality of base stations is received through a second message for X2 interface establishment.

16. The apparatus of claim 12, wherein the type information of the plurality of base stations is received via mobility management entity (MME).

17. An apparatus for a base station, the apparatus comprises:
- a communication unit configured to transmit type information of the base station and information on uplink signal energy of at least one terminal determined by the base station, and to receive a message for transitioning the base station from a closed state to an open state to provide an access service to terminals; and
- a controller configured to provide the access service to the terminals by transitioning the base station from the closed state to the open state,
- wherein the message is received in the closed state where the base station provides no access to the terminals,
- wherein the base station is identified from among a plurality of base stations based on the type information of the base station and the information on the uplink signal energy, and
- wherein the type information of the base station is related to a size of coverage of the base station.

18. The apparatus of claim 17, wherein the message comprises information indicating an amount of load to be processed by the base station.

19. The apparatus of claim 18, wherein the controller is configured to determine whether activating the base station partly or completely based on a capability of the base station and the amount of load to be processed indicated by the message.

20. The apparatus of claim 17, wherein the type information of the base station is transmitted from the base station when the base station is transitioning from the open state to the closed state.

21. The apparatus of claim 17, wherein the type information of the base station is transmitted through a second message for X2 interface establishment.

22. The apparatus of claim 17, wherein the type information of the base station is transmitted via mobility management entity (MME).

23. The method of claim 1, wherein the type information indicates a coverage size, a grade of the coverage size, or a cell type name.

24. The method of claim 6, wherein the type information indicates a coverage size, a grade of the coverage size, or a cell type name.

25. The apparatus of claim 12, wherein the type information indicates a coverage size, a grade of the coverage size, or a cell type name.

26. The apparatus of claim 17, wherein the type information indicates a coverage size, a grade of the coverage size, or a cell type name.

* * * * *